Sept. 15, 1936.  M. OSNOS  2,054,658

TEMPERATURE REGULATING SYSTEM

Filed Feb. 14, 1934

INVENTOR
MENDEL OSNOS
BY
ATTORNEY

Patented Sept. 15, 1936

2,054,658

UNITED STATES PATENT OFFICE 2,054,658

TEMPERATURE REGULATING SYSTEM

Mendel Osnos, Berlin, Germany, assignor to Telefunken Gesellschaft für Drahtlose Telegraphie m. b. H., Berlin, Germany, a corporation of Germany Application February 14, 1934, Serial No. 711,144
In Germany February 8, 1933

10 Claims. (Cl. 236—1)

This invention relates to an arrangement for self-regulation of temperature of a body.

This application is particularly concerned with certain improvements in the subject matter disclosed in my copending application Serial No. 589,446, filed January 25, 1932.

The above-mentioned patent application is concerned with an arrangement to insure self-regulation of temperature of a body, there being produced inside the medium or ambient surrounding the body to be controlled or the vessel containing the body, different temperature-levels preferably varying in dependence upon height by suitably disposed heating means, the body to be treated or controlled being automatically or by the intermediary of suitable adjusting means, set to the requisite temperature level. It is important in this connection that inside the liquid there should prevail as uniform as possible a fall (say, a linear fall) of temperature in the direction from the top towards the bottom.

If the cross-section of the liquid is constant, for instance, for all heights or levels, a constant temperature gradient would be obtainable only if the lateral walls of the liquid-container were absolutely heat-insulating. However, actual tests have demonstrated that even in the case where the vessel consists, for instance, of a double-walled or jacketed cylinder having an exhausted and metallized inside space, heat will nevertheless leak away to the outside so that no perfectly linear temperature fall in the liquid from top towards the bottom is obtainable.

According to this invention, in order to insure a temperature drop at different levels of the liquid that comes closer to a linear law the ratio $$y = \frac{Ri}{Rf}$$

(where $Ri$ and $Rf$, respectively the heat resistance (figured in the direction of heat propagation) of the insulation means of the respective layer or the liquid of the respective layer), is made to bear such a dependence upon the temperature that at the points where the temperature is higher, also the value of $y$ is higher.

Another way in which to describe how my invention insures a uniform temperature drop at different levels is by stating that as it is the normal tendency of heat to rise, I propose to increase the amount of heat insulation at the upper portion of the container by flaring out its walls.

A number of exemplified schemes to illustrate the idea are shown in the accompanying drawing, in which, Fig. 1 is a cross section through the temperature regulating system.

Figure 3:
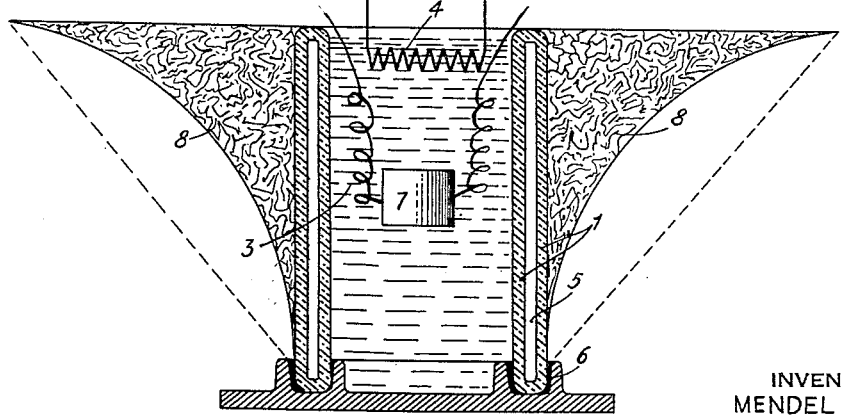
Fig. 3 is a cross section through another modification of the temperature regulating system.

Throughout the drawing like numerals refer to similar parts, in which 1 is the glass container, 2 heat conduction ("abduction") plate made of metal, 3 liquid (oil), 4 heat resistor, 5 evacuated and metallized space in the wall of the glass container, 6 cementing mass, 7 is a floating member inside of which the object or article whose temperature is to be stabilized is confined, 8 in Fig. 3 only there is shown insulation of wool fiber or the like.

Figure 1:
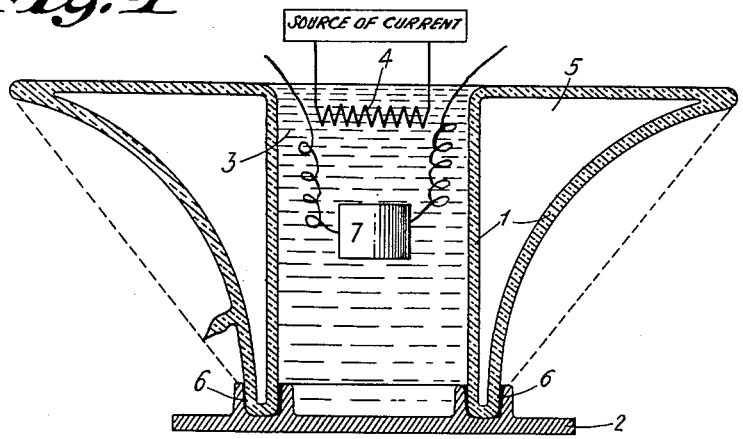

In an arrangement as illustrated in Fig. 1 the inner wall of the vessel is cylindrical while the outer wall is cup-shaped.

In this case the heat resistance $Rf$ (the reciprocal of the thermal conductivity of the respective layer) is the same for all layers of the liquid; heat resistance $Ri$, on the other hand, of the heat-insulating wall (figured in the direction of the heat flux) is higher for the upper strata than for the lower ones with the result that the ratio $y$ for higher temperature levels is here greater than for the lower ones.

Figure 2:
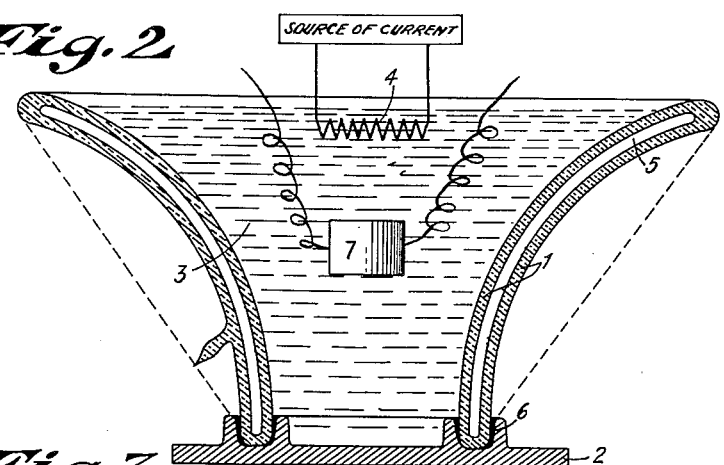
Fig. 2 is a cross section through a modification of the temperature regulating system.

In the arrangement shown in Fig. 2 both walls are made cup-shaped with the result that quantity $Rf$ is here lower for higher strata of the liquid so that it falls with growing temperature, so that $y$ becomes greater for rising temperatures.

In an arrangement as shown in Fig. 3 both walls 1, 1 of the container of liquid are cylindrical. Instead of flaring out the walls, as shown in Figs. 1 and 2, an insulator such as wool, rock wool, kieselguhr or a similar thermal insulator is applied on the outside in the form of a cup.

The outer walls of the device as shown in all of the drawings could be made pyramidal, conical, inverted, as indicated by the broken lines, or any other similar or equivalent form instead of the cup-shape, though the latter is preferable.

It is advisable to so distribute the heater, for instance, in the form of a network, zigzag grid or grating, or the like, over the cross-section of the heated upper layer that this layer will experience as far as feasible a uniform heating.

I claim:

1. A temperature regulation system having a device for the self-regulation of temperature of a body, said device comprising a cylinder having double walls, a liquid and a heating element within said cylinder, a floating member within said liquid, the space between said walls being evacuated, heat insulation surrounding said double-walled cylinder, the outside contour of which is flared out toward the top.

2. A temperature regulation system having a device for the self-regulation of temperature of a body, said device comprising a cylinder having double walls, a liquid and a heating element within said cylinder, a floating member within said liquid, heat insulation surrounding said double walled cylinder, the outside contour of which is flared out toward the top.

3. A temperature regulation system having a device for the self-regulation of temperature of a body, said device comprising a container having double walls, a coating of insulation surrounding the outside of said double walls, a liquid and a heating element within said container, said heating element being adjacent the upper end of said container, a floating member within said liquid, said floating member adapted to contain the body whose temperature is to be regulated, a metallic base to which said container is secured, the outside contour of said insulation being flared out toward the top.

4. A temperature regulation system having a device for the self-regulation of temperature of a body, said device comprising a double-walled container in the form of an inverted cone, a liquid and a heating element within said container, said heating element being adjacent to the upper end of said container, a floating member within said liquid, said floating member adapted to retain the body whose temperature is to be regulated, the space between said container walls being evacuated, and heat insulation surrounding said double-walled container.

5. A temperature-regulation system having a device for the self-regulation of temperature of a body, said device comprising a straight-sided cylinder with double walls, a liquid and a heating element within said cylinder, said heating element being adjacent to the upper end of said cylinder, a floating member within said liquid, said floating member adapted to retain the body whose temperature is to be regulated, the space between said walls being evacuated, heat insulation surrounding the double walls of said cylinder, the outside container of which is flared out toward the top.

6. A temperature regulation system having a device for the self-regulation of temperature of a body with this characteristic feature that for different levels inside a container having a liquid, a floating member within said liquid containing the element to be regulated, and a heating element located adjacent to the top of said container and in heat exchanging relationship with said liquid, the ratio $$y = \frac{Ri}{Rf}$$

(where $Rf$ and $Ri$ are the heat resistances figured in the direction of heat propagation, of the liquid stratum of the respective level and the heat resistance of the stratum of the adjacent container wall which includes heat insulation means) is made to bear such a dependence upon temperature that at the places where the temperature is higher the value of "$y$" is greater.

7. A temperature regulation system having a device for the self-regulation of temperature of a body, said device comprising a container having double walls, a liquid and a heating element within said container, a floating member within said liquid, the space between said walls being evacuated, heat insulation surrounding said double-walled container, the outside contour of which is flared out toward the top.

8. A temperature regulation system having a device for the self-regulation of temperature of a body, said device comprising a container having double walls, the inner wall being cylindrical in shape, the outer wall being cup-shaped, a liquid and a heating element within said container, a floating member within said liquid, the space between said walls being evacuated, heat insulation surrounding said double-walled container, the outside contour of said cup-shaped walls being flared out toward the top.

9. A temperature regulation system having a device for the self-regulation of temperature of a body, said device comprising a container having double cup-shaped walls, a liquid and a heating element within said container, a floating member within said liquid, the space between said walls being evacuated, heat insulation surrounding said double cup-shaped walls, the outside contour of both walls being flared out toward the top.

10. A temperature regulation system having a device for the self-regulation of temperature of a body, said device comprising a container having double walls, a liquid and a heating element within said container, a floating member within said liquid, the space between said walls being evacuated, heat insulation surrounding said double-walled container, the outside contour of which is flared out toward the top, and a metallic base to which said container is secured.

MENDEL OSNOS.